(12) United States Patent
Calvert et al.

(10) Patent No.: US 6,318,551 B1
(45) Date of Patent: Nov. 20, 2001

(54) METHOD AND APPARATUS FOR INSTALLING A PREPACKAGED PISTON ASSEMBLY IN AN ENGINE

(75) Inventors: Kenneth D. Calvert; Weaver Houston, Jr., both of Peoria; Michael D. Wesner, Morton, all of IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/438,071

(22) Filed: Nov. 10, 1999

(51) Int. Cl.$^7$ ................................................. B65D 85/68
(52) U.S. Cl. ............................. 206/319; 29/888.044
(58) Field of Search ............................ 206/318, 319, 206/335, 446; 29/222, 888.04, 888.061, 434, 559, 888.044, 888.07; 123/193.1, 193.6

(56) References Cited

U.S. PATENT DOCUMENTS

| | | |
|---|---|---|
| D. 316,214 | 4/1991 | O'Donnell . |
| 3,946,873 | * 3/1976 | MacDonnell ...................... 206/592 |
| 4,480,368 | 11/1984 | Vachon . |
| 4,594,760 | * 6/1986 | Dillard ............................. 206/319 |
| 4,615,440 | * 10/1986 | Downing .......................... 206/319 |
| 4,722,440 | * 2/1988 | Johnston .......................... 206/319 |
| 4,941,440 | 7/1990 | Weber et al. . |
| 5,307,732 | 5/1994 | Berlinger . |
| 5,588,525 | * 12/1996 | Rosler .............................. 206/319 |
| 5,765,272 | 6/1998 | Borcicky . |

FOREIGN PATENT DOCUMENTS

WO 84/03082    8/1984  (WO) .

OTHER PUBLICATIONS

Bombardier Inc. Shop Manual dated 1989, 6 pages, Quebec, Canada.

* cited by examiner

*Primary Examiner*—Luan K. Bui
(74) *Attorney, Agent, or Firm*—Larry G. Cain; Thomas L. Derry

(57) ABSTRACT

This invention relates generally to a piston assembly and more specifically to a piston assembly in a prepackaged configuration. The prepackaged piston assembly is ready for immediate installation into an engine or compressor. The piston assembly has a plurality of rings preinstalled on a piston member and a sleeve position about the piston member and the plurality of rings maintaining the rings in a compressed position ready for installation into an engine. The piston assembly is lowered into a cylinder bore, the sleeve contacts the top surface of a block and the piston assembly can be easily installed into the cylinder bore without the need for the mechanic to compress the plurality of rings. Thus the present invention reduces time and expense required for rebuilding and engine and increases the quality of the rebuild.

7 Claims, 3 Drawing Sheets

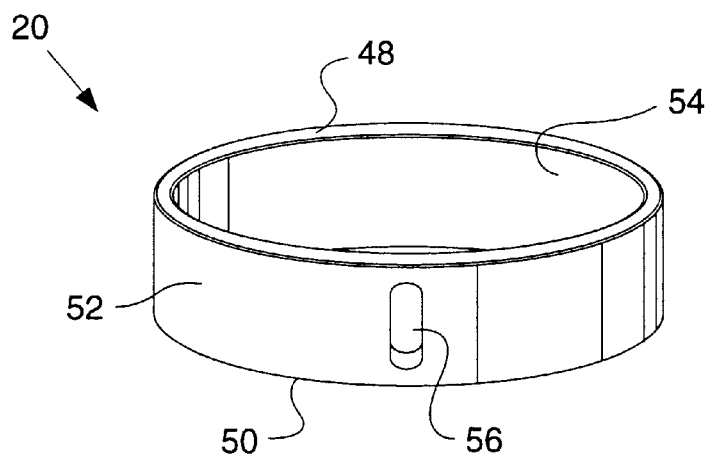
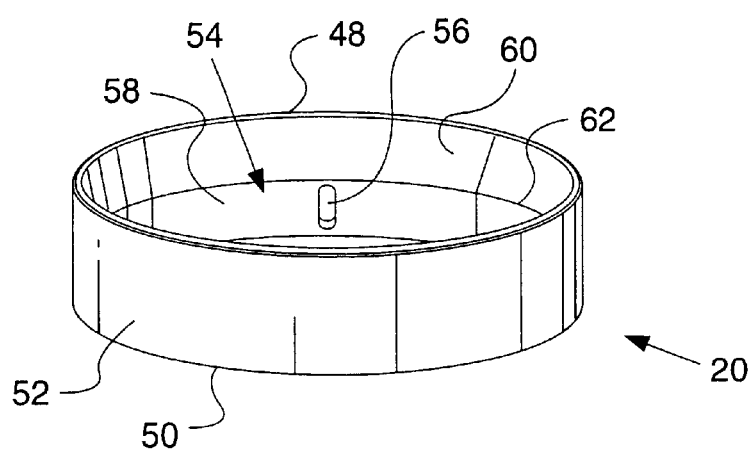

METHOD AND APPARATUS FOR INSTALLING A PREPACKAGED PISTON ASSEMBLY IN AN ENGINE

TECHNICAL FIELD

This invention relates generally to an internal combustion engine and more specifically to a prepackaged piston assembly which has a plurality of piston rings positioned on a piston member in a compressed position.

BACKGROUND ART

Internal combustion engines have numerous moving components which undergo wear during normal usage. When the components of an engine have undergone an excessive amount of wear the performance and efficiency of the engine is reduced. Engines which have undergone excessive wear are often rebuilt by replacing major components. Some of the components that are normally replaced during the rebuilding process are pistons, piston rings, connecting rods, rod bearings, and main bearings. This rebuilding of the engine brings the engine back to, or near the engine manufacturer's original performance or specifications. To insure the quality of the rebuilt engine the rebuild process is preferably done in a controlled environment such as a factory or repair shop.

Often with large machines utilizing internal combustion engines, such as those used in the construction and mining industry, the size of the machine restricts transportation to an engine rebuild shop, or the time permitted for the rebuild process requires that the engine of the machine be rebuilt in the field. Often when engines are rebuilt the quality of the rebuild may be jeopardized due to incorrect inspection or assembly of major components such as pistons and piston rings. Loss of quality may increase with engines which are rebuilt in the field under less than an ideal controlled environment.

Additionally the amount of time required to prepare components such as piston assemblies for the rebuild process may be significantly greater in a repair shop or the field than if the same work is done in a factory where larger quantities of components are assembled and manufacturing processes and procedures can be systematically followed. Often in the factory, repetitive work is performed at lower labor cost than where the same work is performed by a skilled mechanic in the field.

The present invention overcomes many of the above identified problems by providing a piston assembly which has been inspected and assembled in a factory environment and packaged in a manner which reduces the likelihood of quality related problems. Labor cost to assemble an engine may also be reduced by eliminating the number of steps to rebuild the engine.

DISCLOSURE OF THE INVENTION

In one aspect of the invention a piston assembly has a prepackaged configuration and is adapted for use with an engine. The engine is comprised of a piston member with a plurality of ring grooves. A plurality of rings are positioned in the ring grooves. A sleeve is positioned about the piston member and the plurality of rings, maintaining the plurality of rings in a compressed position. A container is positioned about the piston member, plurality of rings, and the sleeve.

In another aspect of the invention a method of assembling a piston assembly in an engine is disclosed. The piston assembly has a prepackaged configuration and comprises a piston member with a plurality of rings thereon and a sleeve positioned around the piston assembly and the plurality of rings. The sleeve maintains the plurality of rings in a compressed position. The method of assembly comprises the following steps. Removing the piston assembly from a container. Positioning the piston assembly in alignment with a cylinder bore. Removing the piston assembly from the sleeve. And, simultaneously inserting the piston assembly into the cylinder bore.

BRIEF DESCRIPTION OF THE DRAWINGS

FIG. 3 is a perspective view of a sleeve for maintaining the rings of the prepackaged piston assembly in the compressed position; and FIG. 4 is a perspective view of a second embodiment of the sleeve for maintaining the rings of a prepackaged piston assembly in the compressed position.

BEST MODE CARRYING OUT THE INVENTION

Although this embodiment of the present invention refers to use of a piston assembly 2 in a prepackaged configuration 4 it should be recognized that the invention is equally as valuable in use with an air compressor or other machines using piston assemblies.

Figure 1:
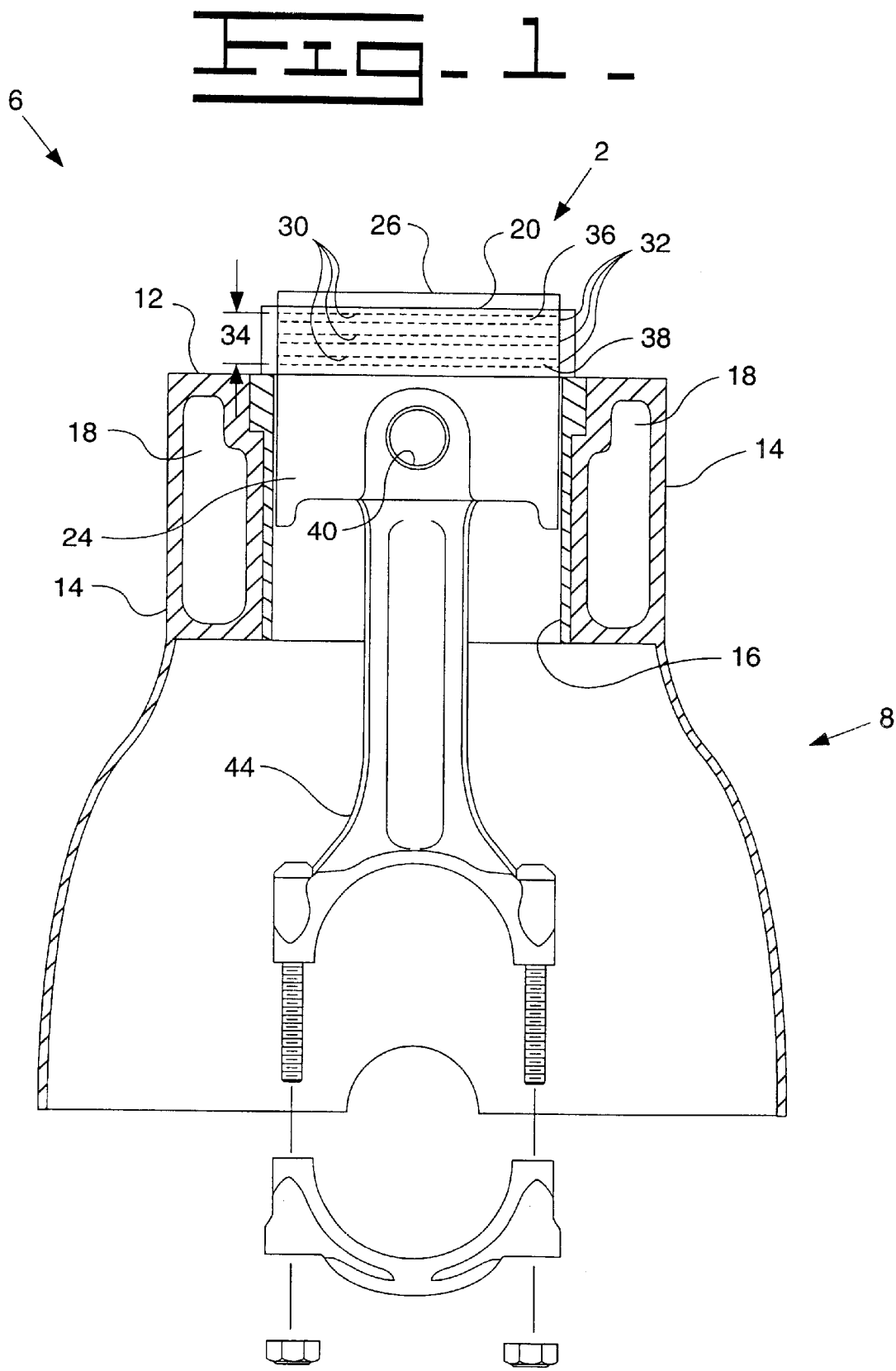
FIG. 1 is a partially sectioned view of an engine having a prepackaged piston assembly partially installed therein.

Referring first to FIG. 1, an engine 6 is illustrated as a partially sectioned view showing an engine block 8. A portion of a prepackaged piston assembly 10 is also shown. The block 8 defines a top surface 12 and a pair of outer walls 14 extending downward from each end of the top surface 12. A cylinder bore 16 extends downward from the top surface 12. The cylinder bore 16 may be positioned in a replaceable liner or a fixed bore in the engine block 8. In this application, a water jacket 18 is interposed the cylinder bore 16 and the outer walls 14; however, as an alternative the engine 6 could be air cooled.

Figure 2:
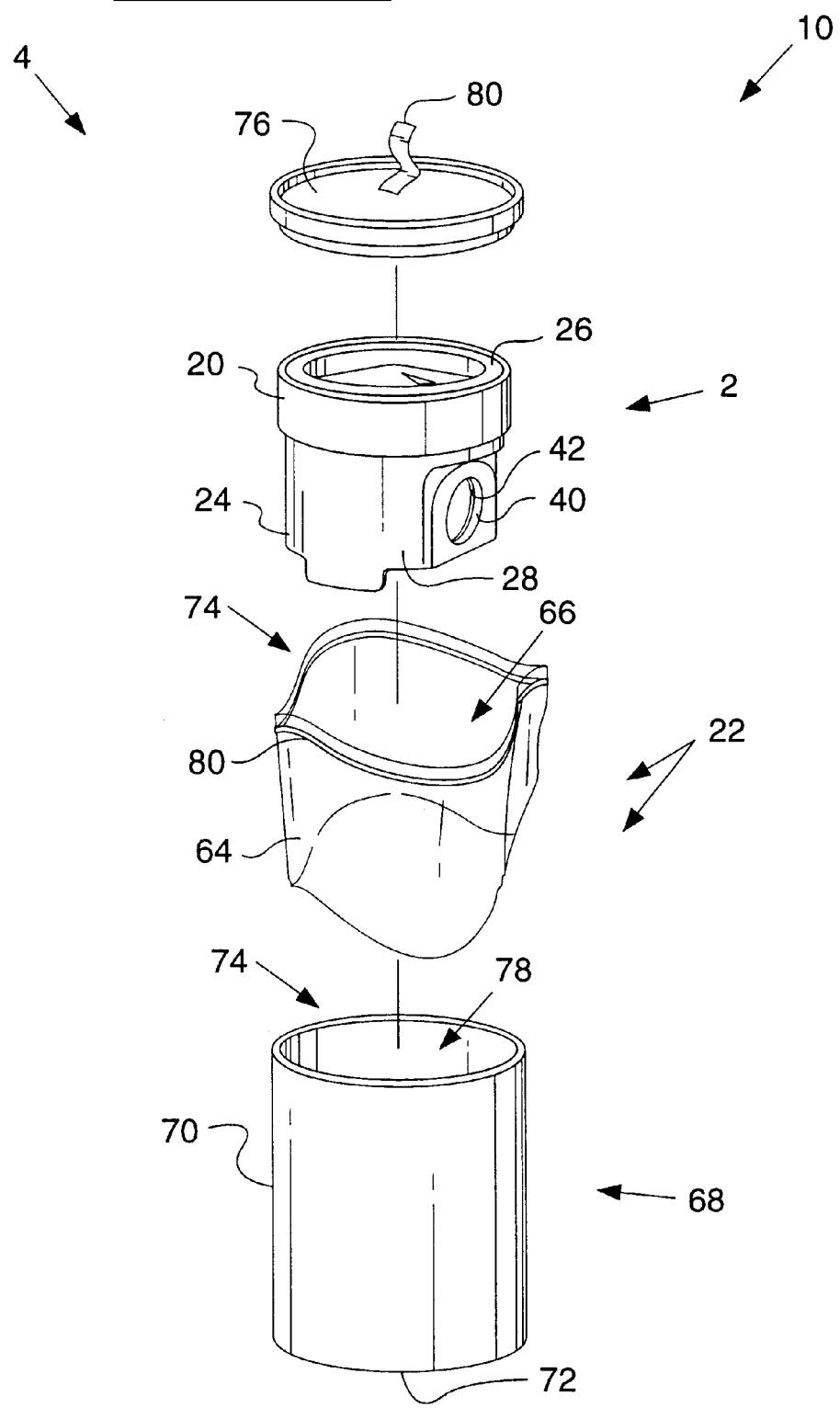
FIG. 2 is a exploded view of a piston assembly and components of the prepackaged configuration.

The prepackaged piston assembly 10 as best shown in FIG. 2 is comprised of a piston assembly 2, a sleeve 20 and a container 22. The piston assembly 2 has a piston member 24 having a top portion 26 and an outer surface 28 defined on the piston member 24. A plurality of ring grooves 30 are positioned in the outer surface 28 below the top portion 26 and a plurality of rings 32 are inserted in the ring grooves 30. The plurality of rings 32 define a ring spread 34. The ring spread 34 can be defined as an axial distance between the top of a top ring groove 36 and the bottom of a bottom ring groove 38. A wrist pin bore 40 extends through the outer surface 28 of the cylindrical piston member 24. A snap ring groove 42 is defined within the wrist pin bore 40 near each end of the wrist pin bore 40. As an alternative the piston assembly 2 may further have a connecting rod 44. The connecting rod 44 is affixed to the piston member 24 in a conventional manner by using a wrist pin.

In the prepackaged configuration 4 of the piston assembly 2, a sleeve 20 is positioned about the piston member 24 and the plurality of rings 32. The sleeve 20 maintains the plurality of rings 32 in a compressed position.

As further shown in FIG. 3, a perspective view of the sleeve 20 of the present invention is illustrated. The sleeve 20 has a top surface 48 a bottom surface 50 and an outer wall 52. A sleeve bore 54 extends between the top surface 48 and the bottom surface 50. A window 56 may extend from the outer wall 52 to the sleeve bore 54. An alternative to the window 56 is a sleeve being made from a transparent material. The sleeve bore 54 is of a predetermined diameter which is equal to or slightly smaller than the diameter of the cylinder bore 16 and slightly larger the outside diameter of the piston member 24.

As further shown in FIG. 4, an alternate embodiment of the sleeve 20 is shown. The sleeve 20 has a top surface 48 a bottom surface 50 and an outer wall 52. A sleeve bore 54 is defined between the top surface 48 and the bottom surface 50. The sleeve bore 54 defines a straight portion 58 extending from the bottom surface 50 toward the top surface 48. A tapered portion 60 of the sleeve bore 54 extends outwardly from a top end 62 of the straight portion 58 to the top surface 48. The length of the straight portion 58 is at least equal to the ring spread 34 of the piston member.

As further shown in FIG. 2, in the prepackaged configuration 4, the piston assembly 2 is sealed in a container 22. In this embodiment the container is a plastic bag 64. The plastic bag is coated on the inside with a rust inhibitor/lubricant. The plastic bag 64 defines a cavity 66 which is capable of accommodating the prepackaged configuration 4 of the piston assembly 2. Alternatively of the plastic bag 64, a flexible sheet with a protective coating and a seal could be used.

An additional container 68 may also be provided but is not required in the present invention. The container 68 in the this application has a cylindrical configuration, but as an alternative could have other shapes such as a square or octagonal configuration. The cylindrical container 68 has a container wall 70 and a bottom 72. An opening 74 in a top end of the cylindrical container 68 is closable. For example a cap 76 can be positioned in the opening 74. Or as an alternative the cylindrical container 68 could be a box having an attachable lid or cover. The cylindrical container 68 defines a container cavity 78 which is of a sufficient size to allow insertion of the prepackaged configuration 4 of the piston assembly 2. The cylindrical container 68 holds the components firmly therein. A container seal 80 may be provided on the cap 76 of the cylindrical container 68 to engage the container wall 70 when the cap 76 is positioned within the cylindrical container 68. Additionally, alternate containers could be manufactured from foam or fiber materials.

While the invention is susceptible to various modifications and alternative forms, a specific embodiment thereof has been shown by way of example in the drawings and is herein described in detail. It should be understood, however, that there is no intent to limit the invention to the particular form disclosed, but on the contrary, the intention is to cover all modifications, equivalents, and alternatives falling within the spirit and scope of the invention as defined by the appended claims.

Industrial Applicability

The prepackaged piston assembly 10 of the present invention is prepared in the following manner. Components including the piston member 24 the plurality of rings 32 and the sleeve 20 are gathered and inspected for conformity to manufacturer's specifications. The plurality of rings 32 are installed into the ring grooves 30 in the appropriate positions. The plurality of rings 32 are compressed using a conventional ring compressor. A sleeve 20 is positioned around the piston member until the sleeve 20 contacts the ring compressor. The sleeve 20 is pushed or pulled against the ring compressor sliding the sleeve 20 over the plurality of rings 32. As the sleeve 20 slides over the plurality of rings 32 the ring compressor slides off of the plurality of rings 32. When the plurality of rings are confined completely within the sleeve bore 54 the ring compressor is removed from the piston member 24.

If the sleeve 20 of the embodiment of FIG. 4 is to be used, the step of compressing the plurality of rings 32 would not require a conventional ring compressor. After the plurality of rings 32 are properly positioned on lower portion of the piston member 24 the sleeve 20 is positioned over the piston member 24 with the tapered portion 60 toward the plurality of rings 32. The sleeve 20 is them moved toward the plurality of rings 32 wherein the tapered portion compresses the plurality of rings 32 as it moves. Movement of the sleeve 20 is ceased when the plurality of rings 32 are confined within the straight portion 58 of the sleeve 20.

A connecting rod 44 can be included with the piston assembly 2 or attached by the mechanic, since the sleeve 20 does not interfere with access to the wrist pin bore 40. The piston assembly 2 is next inserted into the a container 22 impregnated with a rust inhibitor/lubricant. The container 22 and rust inhibitor/lubricant protects the piston assembly 2 from environmental contaminants such as dirt and moisture during storage and transportation of the prepackaged piston assembly 4. The prepackaged piston assembly 4 can be positioned in a second container 68 to protect the piston assembly 2 from physical damage such as breaking or scratching. However it is possible to have a single container which is capable of protecting the piston assembly 2 from all of the previously mentioned concerns. The container(s) 22, 68 can additionally be sealed in a manner which requires breaking of the seal 80 when the prepackaged piston assembly 10 is opened by the mechanic. Usage of the seal 80 verifies to the mechanic that the piston assembly 2 has not been tampered with and conforms to the manufacturers' specifications.

After the engine block 8 has been prepared for assembly, installation of the piston assemblies 2 is accomplished by breaking the seal 80 and opening the container 22. The piston assembly 2 is then removed from the container 22. Although not required for the proper use of this invention, but desirable of a diligent mechanic, the position of the plurality of rings 32 may be verified through the transparent sleeve 20 or window 56. In this example a connecting rod 44 is attached to the piston assembly 2. The piston assembly 2 is now positioned above the respective cylinder bore 16 waiting installation. The piston assembly 2 is next lowered toward the cylinder bore 16 with the connecting rod 44 inserted first. The piston assembly 2 is further lowered toward and into the cylinder bore 16 until the bottom surface 50 of the sleeve 20 contacts the top surface 12 of the engine block 8. When the sleeve 20 contacts the block 8 the piston assembly 2 can be further inserted into the cylinder bore 16 by pushing on the top portion 26 of the piston member 24 or by pulling on the connecting rod 44. After the plurality of rings 32 have entered the cylinder bore 16 the sleeve 20 can be discarded. When all piston assemblies 2 have been installed into the engine 6 the remainder of the engine 6 components are assembled in a typical fashion.

The sleeve 20 of the present invention can be manufactured in a number of ways. Metal sleeves 20 can be machined from a removable cylinder liner by cutting the sleeves 20 to length and deburring the cut edges. Additionally sleeves 20 could be cut from a piece of tube or pipe with the proper inside diameter. A third method of manufacturing sleeves 20 could include injection molding from a plastic or alternate material.

Primary considerations of manufacturing sleeves 2 is to select a material which is sufficiently rigid to resist distortion and thermal expansion. Since there is typically only 0.002" difference between the inside diameter of the cylinder bore 16 and the outside diameter of the piston member 24 the material characteristics must allow manufacturing to close tolerances. The cost of the selected material for the sleeve 20 should also be inexpensive, thus allowing the sleeve 20 to be discarded after a single use. Recycling sleeves 20 at this time does not appear to be a cost effective option since it would require the added expense of transportation.

Thus is can be seen that using a piston assembly 2 in the prepackaged configuration 4 during the assembly of an engine 6 increases quality of the rebuilt engine 6 by insuring that the piston assembly meets or exceeds manufacturers' specifications. Quality of the rebuilt engine 6 is also enhanced when because the piston assembly 2 is less likely to be contaminated by dirt or moisture. The cost of rebuilding an engine 6 using the prepackaged piston assembly 10 is reduced because the time required to assembly large quantities of piston assemblies 2 in a factory setting is typically less than assembling small quantities in the field.

What is claimed is:

1. A prepackaged piston assembly having a preestablished configuration and being adapted for use with an engine, said prepackaged piston assembly comprising:

a piston member having a plurality of ring grooves therein;

a plurality of rings being positioned within said plurality of ring grooves, said plurality of rings having an expanded position and a compressed position;

a sleeve being positioned about said piston member and said plurality of rings, said sleeve maintaining said plurality of rings in said compressed position; and a container being positioned about said piston member, plurality of rings and sleeve, said container being impregnated with a lubricant/rust inhibitor.

2. The prepackaged piston assembly of claim 1, wherein the container is a bag.

3. The prepackaged piston assembly of claim 2, wherein said container is sealed.

4. The prepackaged piston assembly of claim 1, wherein said container being manufactured from a cardboard material.

5. The prepackaged piston assembly of claim 1 wherein said container being manufactured of a plastic material.

6. The prepackaged piston assembly of claim 1, said container having a closed bottom.

7. The prepackaged piston assembly of claim 1, said container having a closable top.

* * * * *

UNITED STATES PATENT AND TRADEMARK OFFICE
CERTIFICATE OF CORRECTION

PATENT NO. : 6,318,551 B1
DATED : November 20, 2001
INVENTOR(S) : Kenneth D. Calvert et al.

It is certified that error appears in the above-identified patent and that said Letters Patent is hereby corrected as shown below:

<u>Title page,</u>
Item [75], listed as: "[75] Inventors: Kenneth D. Calvert; Weaver Houston, Jr., both of Peoria; Michael D. Wesner, Morton, all of IL (US)" should be listed as:
-- [75] Inventors: Kenneth D. Calvert; Houston Weaver, Jr., both of Peoria; Michael D. Wesner, Morton, all of IL (US) --

Signed and Sealed this

Third Day of June, 2003

JAMES E. ROGAN
*Director of the United States Patent and Trademark Office*